Patented June 21, 1932

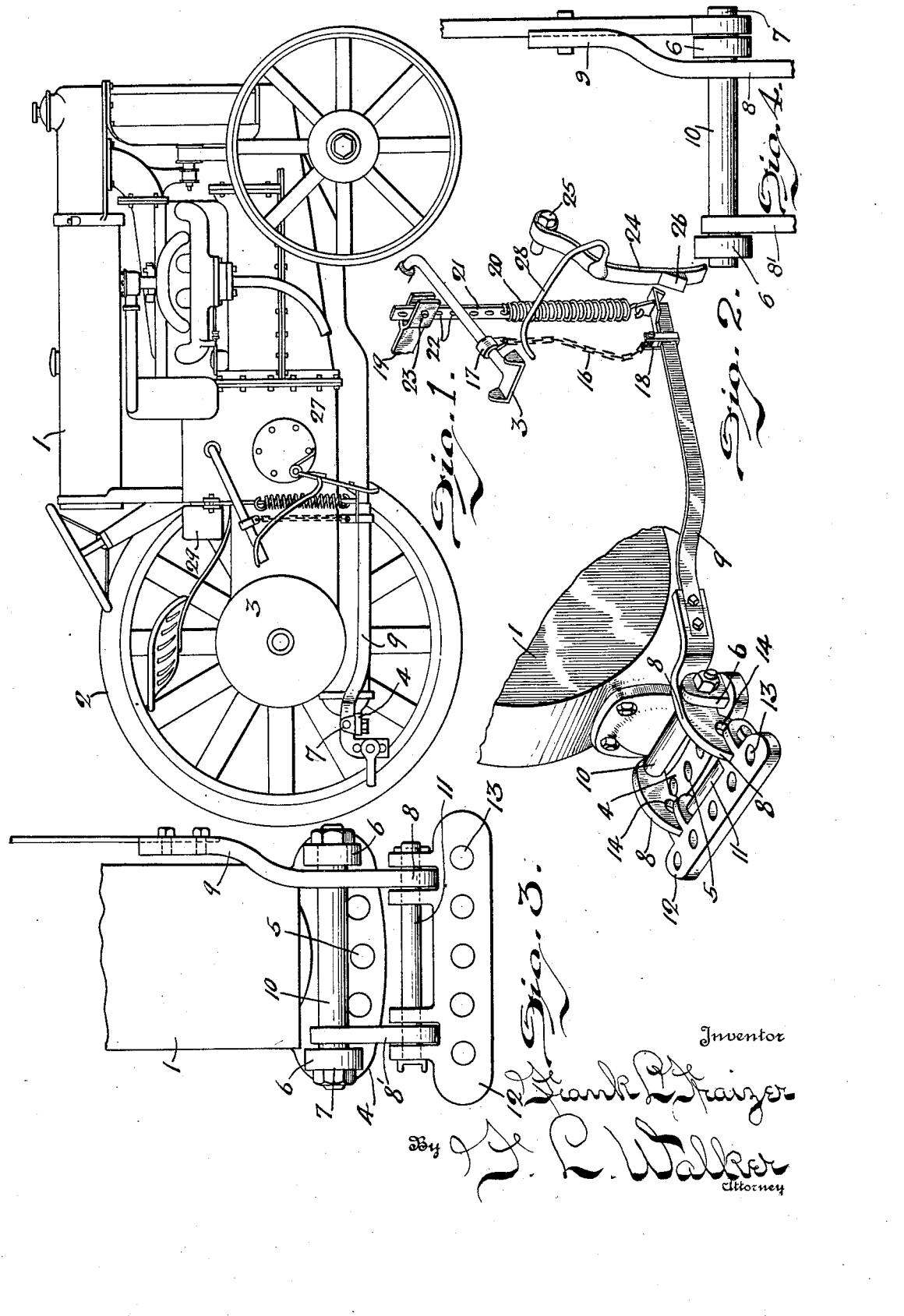

1,864,128

UNITED STATES PATENT OFFICE

FRANK L. FRAIZER, OF TROY, OHIO, ASSIGNOR OF ONE-HALF TO JOHN R. MARSHALL, OF TROY, OHIO

TRACTOR HITCH

Application filed December 26, 1928. Serial No. 328,497.

My invention relates to safety draft mechanisms for power tractors, and more particularly to an automatic strain operated mechanism for arresting the tractor when the draft resistance exceeds a predetermined degree.

Power tractors are used for a wide variety of purposes including drawing plows, scrapers, excavators, for heavy hauling and various analogous operations. Not infrequently, abnormal conditions are encountered wherein the drawn implement, whether it be a plow, a scraper, excavator or other apparatus, engages a stone, or stump or other obstruction which arrests its progress, thus subjecting the implement and also the tractor as well as the intermediate coupling to excessive strain. Unless the operator is able to instantly stop the tractor, breakage of the apparatus or coupling or other damage thereto may result. Heretofore, various forms of automatic release couplings, yielding hitches, and various forms of tractor arresting mechanism has been devised. In the present construction the last form of safety mechanism, to wit; the tractor arresting type of apparatus has been embodied in a simplified form, which while applicable to tractors of the general types now employed, is especially designed for application to a popular and well known tractor widely employed for farming operation.

In the present embodiment the apparatus is designed to employ attachment means existing upon the tractor thereby avoiding necessity for drilling holes or providing special mounting means upon the tractor structure. It embodies a bell crank lever having a short arm to which the drawn implement or vehicle is to be attached, and a long arm having operative connection with the tractor control pedal. The connection between the long arm of the bell crank lever and the tractor control pedal, permits a limited independent oscillation of the lever under normal fluctuations of draft resistance, against the tension of a retracting spring attached to such long arm of the lever. However upon abnormal deflection of the lever under influence of overload tension applied to the short arm of such bell crank lever, the tractor control pedal is operated to arrest the tractor. At the same time a detent operates to hold the lever in its operated position. A release arm for the detent extends into proximate relation with a pedal whereby it is engaged by the operator's foot in applying foot pressure to the pedal, thereby releasing the detent and restoring the mechanism. At its rear end coincident with its shorter arm, the bell crank lever is widened into a frame like head which is pivotally secured to the draw head of the tractor, and in turn a second draw head is attached to the lever for coupling engagement with the drawn implement or vehicle. The tool box mounting of the popular type of tractor referred to affords a suitable mounting for a spring supporting bracket arm, while a screw stud attaching a removable plate to the side of the tractor affords a suitable mounting for the detent.

The object of the invention is to simplify the structure as well as the means and mode of operation of traction operated throw-out mechanism for tractors and the like, whereby they will not only be cheapened in construction, but will be more efficient in use, positive in operation, uniform in action and unlikely to get out of order.

A further object of the invention is to provide an automatic tractor arresting mechanism which will be of few parts and sturdy construction capable of being applied to existing tractors with minimum effort.

A further object of the invention is to provide such overload throw-out mechanism which will utilize existing attachment means upon the tractor and hence enable the installation of the apparatus by unskilled labor.

A further object of the invention is to provide such automatic strain operated mechanism having a comparatively wide range of adjustment enabling it to be accurately set for predetermined strain or resistance operation.

With the above primary and other incidental objects in view, the invention consists of the features of construction, the parts and combinations thereof, and the mode of operation or their equivalents as hereinafter described and set forth in the claims.

Referring to the drawing wherein is shown the preferred, but obviously not necessarily the only form of embodiment of the invention, Fig. 1 is a side elevation of a popular type of power tractor to which the present invention has been applied. Fig. 2 is a perspective view of the automatic release or throw-out mechanism removed from the tractor. Fig. 3 is a top plan view of a portion of the apparatus. Fig. 4 is a detail top plan view of a modification of the connection of the operating lever.

Like parts are indicated by similar characters of reference throughout the several views.

In the drawing 1 indicates the tractor, of which one of the carrying wheels 2 has been removed to expose to view the present automatic safety apparatus. The tractor 1 is controlled by the usual clutch pedal 3, which, when depressed, causes the transmission clutch to be disengaged, and the tractor arrested. At the rear end of the tractor is the usual draw head 4 to which a trailing implement or vehicle is to be coupled. In the present construction the original draw head 4 is utilized as the main mounting of the present apparatus to which a supplemental draw head is in turn connected. The draw head 4 is ordinarily provided with a series of holes 5 for coupling purposes. In the present instance, eye bolts 6 are mounted in the outermost holes 5 of the draw head, in which eye bolts there is pivotally mounted an oscillatory bell crank lever which is the primary element of the present construction. This bell crank lever pivoted at 7 in the eye bolt 6, comprises a rearward, downwardly turned, short arm 8 and a forwardly extending long arm 9. To equalize the draft strain, the head of the bell crank lever is extended laterally by duplication of the dependent short arm 8, as indicated at 8'. The duplicate arms 8 and 8' are integrally united by the intermediate shaft 10, the ends of which are journalled in the eye bolts 6. As a matter of fact, the duplicate short arms 8 and 8' and the initial intermediate connecting shaft 10 together with the initial portion of the long arm 9 of such lever, are preferably cast as an integral unit, and the arm extension 9 bolted thereto. Pivotally connected with the dependent short arms 8—8' by a transverse trunnion pin 11 is a second draw head 12 having therein a series of holes 13 for coupling of the trailing implement or vehicle. The dependent arms 8—8' are provided with a series of holes 14 in which the second draw head 12 may be connected at greater or less distance from the fulcrum point of the bell crank lever.

The long arm 9 of the bell crank lever is connected with the control pedal 3 in such manner as to permit a normal range of independent movement of both the pedal and the lever arm. For practical operation a flexible connection such as the chain 16 connected to the pedal arm 3 by a clevis 17 and to the arm 9 of the bell crank lever by similar clevis 18, has been found to be quite suitable and efficient. Projecting from the tractor 1 is a bracket arm 19 from which is suspended a helical retracting spring 20 connected adjacent to the end of the arm 9 of the oscillatory bell crank lever. The fluctuations of tractive resistance or pull transmitted to the dependent short arms 8—8' of the bell crank lever causes an oscillatory movement of the lever against the tension of the spring 20. Inasmuch as the leverage of the arm 9 is so much greater than that of the arm 8, the spring 20 may be comparatively light and yielding. Due to the leverage ratio of the bell crank lever a comparatively light and weak spring 20 is enabled to resist a quite strong pull or tension applied to the arm 8. The spring 20 is connected with the hanger arm 19 by a suspension bar 21 having therein a series of holes 22 through any one of which the coupling pin 23 may be inserted to thereby vary the tension of the spring 20 and its yielding resistance to the tractive pull exerted upon the bell crank lever. Under varying draft tension the fluctuation of the bell crank lever will normally occur within the range of the flexible connection 16 with the pedal arm 3. However, when the trailing implement or vehicle meets with an obstruction offering abnormal resistance, the lever arm 9 is deflected through a greater range against the tension of the spring 20 carrying with it the pedal control arm 3 thus pulling the pedal into its clutch release position.

At the limit of such abnormal deflection of the arm 9, it is engaged by a detent arm 24 pivoted at 25 to the side of the tractor 1. This arm 24 is provided with a stop shoulder 26 spring actuated into the return path of the arm 9. The pivotal connection of the detent arm 24 is preferably effected by substituting for a stud bolt which ordinarily attaches a plate 27 to the side of the tractor, a similar bolt of greater length which forms the fulcrum or pivotal connection for the arm 24 and also assists in holding the plate 27 in lieu of the original stud. Thus the screw threaded stud hole found in the tractor is utilized for mounting the detent arm. Rigidly connected with the detent arm 24 is an arm 28 extending upwardly and rearwardly into proximate relation with the tractor control pedal 3. Normally this arm 28 extends below the level of the tractor clutch pedal. However, when the pedal is depressed by the abnormal deflection of the lever arm 9, it is drawn somewhat below the level of the end of the detent release arm 28, so that the operator in placing his foot upon the pedal 3 will also engage the end of the arm 28 depressing such arm and thereby disengaging the detent 24 from the lever arm 9, allowing the latter to return under influence of the spring 20. The retractive influence of the spring 20 acting thru the leverage of the arm 9 is sufficient to cause the tractor to settle rearwardly while the clutch is disconnected, and held in such position by the foot of the operator upon the pedal arm 3, to permit such pedal arm to return to its normal upper or clutch engaging position. Before permitting such return, however, the operator reverses the shift lever to reverse the tractor upon the subsequent engagement of the clutch when the operator removes his foot from the pedal 3. The operator is thus enabled to back the tractor sufficient to dislodge the drawn implement or vehicle from the obstruction.

The attachment bolts for the tool box 29 upon the tractor 1 are utilized for attachment of the hanger arm 19, from which the retracting spring 20 is suspended. The arm 19 is provided with spaced holes for engagement over the bolts which are accessible upon removal of the tool box. After mounting the arm on such bolts, the tool box is replaced. Thus the apparatus may be mounted upon the tractor without the necessity for providing additional holes or additional mounting means. In Fig. 4 the arm 9 is shown formed in two parts both of which extend to the pivotal point and are fixedly interconnected.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific details shown, but that the means and construction herein disclosed comprise the preferred form of several modes of putting the invention into effect and the invention is, therefore, claimed in any of its forms or modifications within the legitimate and valid scope of the appended claims.

Having thus described my invention, I claim:

1. In a tractor hitch, an oscillatory L-shaped lever having arms of unequal length pivoted approximately at the juncture of said arms with the shorter arm substantially vertically disposed, a draft attachment connected to the shorter arm of said lever and a spring connected with the longer arm of said lever at a materially greater distance from the fulcrum point than the draft connection, against the yielding resistance of which the lever oscillates under varying resistance of the draft tension, and a tractor control member actuated by the lever when abnormally deflected against the tension of said spring by abnormal resistance of the draft load and means for locking said lever in its operated position.

2. In a device of the character described, an oscillatory lever pivoted intermediate its ends, a spring connected with said lever at one side of its pivotal point against the yielding resistance of which the lever is subject to deflection, a draft load connection to said lever at opposite sides of its pivotal connection and in close proximity to the fulcrum point of the lever, a tractor control member, a connection between the control member and the lever at a point distantly removed from the fulcrum point much greater than the draft load connection, by which the control element is actuated upon abnormal deflection of the lever against the yielding resistance of the spring and a detent in the path of oscillation of said oscillatory lever and engaged thereby as the lever approaches the limit of its swinging movement under excessive draft loads, and an extension on said detent extending into proximate relation with the tractor control member for simultaneous operation therewith to effect release of said lever.

3. In a tractor hitch of the character described, a bell crank lever arranged for vertical swinging movement having a vertically disposed short arm and a horizontally disposed long arm, a draft load coupling having direct connection to the short arm, a spring connected to the longer arm against the tension of which the lever is movable under influence of the draft load, a tractor control member, a flexible connection between the long arm and the tractor control member transmitting motion to the control member whenever the lever is abnormally deflected by unusual resistance of the draft load, and means to temporarily lock the lever in its operated position.

4. In a construction of the character described, an oscillatory lever pivoted intermediate its ends, a draft load connection thereto at one side of its pivotal connection and in proximity to its fulcrum point, a spring connected with said lever at the opposite side of its pivotal connection and against the tension of which the lever is movable under influence of varying resistance of the draft load, a tractor control pedal, an operative connection between the pedal and the lever at a point removed from the fulcrum point a distance greater than the point of connection of the draft load, by which the pedal is actuated upon abnormal deflection of the lever, a detent for said lever when deflected to abnormal degree, and means for releasing the detent simultaneously with subsequent depression of said pedal.

5. An overload throw-out for clutches, including a member movable under the overload, a clutch operating element actuated by said member to release the clutch, a detent for holding said movable member in its operated position independently of the overload operated member, and a release means for the detent extending into proximity to the clutch operating element for simultaneous engagement and operation.

6. In an overload throw-out for clutch operated levers, the combination with a clutch lever, of a member movable under overload, an operative connection between the movable member and clutch operating lever by which the clutch lever is actuated to release position upon the abnormal movement of said member under overload influence, a detent for holding said movable member in its operated position, and release means for said detent actuated by the subsequent operation of the clutch lever.

7. In a device of the character described, the combination with a tractor clutch pedal of a member movable under overload, an actuating connection between said member and pedal by which the pedal is moved to release position upon abnormal movement of said member, a detent for holding said member in operated position, and a release arm for said detent extending in such relation with the pedal that in subsequent depression thereof the operator's foot will effect a release operation of the detent.

8. The combination with a tractor clutch pedal, of a draft operated member operatively connected therewith and adapted to actuate the pedal to release position upon abnormal movement of said member under influence of draft overload, a swinging detent for said movable member, and a release arm for the detent extending into proximate relation with the pedal.

9. The combination with a tractor clutch pedal, of a draft operated lever, a draft connection thereto in close proximity to its fulcrum point, an actuating connection between the lever and pedal at a point more distantly removed from the fulcrum point than the draft connection, a spring against the yielding resistance of which the lever is movable under influence of varying draft strains, said lever being adapted to actuate the pedal to release position upon abnormal deflection, a detent for holding the lever in actuated position against the retractive influence of the spring, and means for releasing the detent by the foot of the operator.

10. An overload throw-out for clutches, including a bell crank lever having a short arm and a longer arm, a clutch operating element operatively connected with the longer arm, and a draft load connection to the short arm, a spring against the tension of which the lever is movable under varying draft load strains, the clutch operating element being actuated by an abnormal deflection of the lever under such draft load strain, a detent for holding the lever in its operated position, and releasing means for said detent operable simultaneously with the further operation of the clutch operating element.

11. The combination with a tractor having a draw head, of a pair of eye bolts engageable therewith, an oscillatory frame journalled in the eye bolts, including a pair of interconnected down turned spaced arms and a forward extending arm, a second draw head connected with the down turned arms, and an operative connection between the forwardly extending arm and the clutch control mechanism of the tractor, whereby the clutch is released by an abnormal deflection of said arm under influence of a draft load upon said second draw head and detent means for automatically locking said arm in its position of abnormal deflection.

12. The combination with a pedal controlled tractor and a draft connection therefor, of mechanism responsive to the tractive effort and operatively connected with the control pedal to render the tractor inoperative when a predetermined tractive effort is exceeded, including a bell crank lever having a short arm and a longer arm, the draft connection being attached to the short arm, a connection between the longer arm and pedal whereby the arm is permitted a limited to and fro oscillation independent of the pedal and adapted upon abnormal deflection of the arm to operate the pedal to its arresting position a detent for automatically locking the arm in its position of abnormal deflection, means for releasing the detent simultaneously with further operation of the control pedal, and a spring against the yielding resistance of which the arm is movable.

13. The combination with a pedal controlled tractor and a draft connection therefor, of mechanism responsive to the tractive effort and operatively connected with the control pedal to render the tractor inoperative when a predetermined tractive effort is exceeded, a detent for holding said tractive responsive mechanism in its operated position independently of the operative tension incident to the operation of the tractive controlled mechanism, and a release arm for said detent extending into proximate relation with the pedal but operable independent thereof for disengaging the detent.

14. The combination with a pedal controlled tractor and a draft connection therefor of mechanism responsive to the tractive effort and operatively connected with the control pedal to render the tractor inoperative when a predetermined tractive effort is exceeded, including an oscillatory lever to which the draft connection is attached in proximate relation with its fulcrum, an operative connection between the pedal and said lever at greater distance from the fulcrum than the draft connection, a spring against the yielding resistance of which the lever is movable, the abnormal deflection of the lever being transmitted to the pedal by said operative connection to arrest the tractor, a detent for holding the lever in operated position and a depressible release arm for the detent extending into proximate relation with the pedal but operative independent thereof to permit restoration of the mechanism.

In testimony whereof I have hereunto set my hand this 12th day of December, A. D. 1928.

FRANK L. FRAIZER.